United States Patent

Mako et al.

[11] 4,060,812
[45] Nov. 29, 1977

[54] NOZZLE FOR AN INK JET PRINTER

[75] Inventors: John Mako, Endicott; Walter Thornton Pimbley, Vestal, both of N.Y.

[73] Assignee: International Business Machines Corporation, Armonk, N.Y.

[21] Appl. No.: 741,825

[22] Filed: Nov. 15, 1976

[51] Int. Cl.² ............................................. G01D 15/18
[52] U.S. Cl. ................................. 346/75; 346/140 R
[58] Field of Search ............... 346/75, 140 R; 310/8.2

[56] References Cited

U.S. PATENT DOCUMENTS

| 3,683,212 | 8/1972 | Zoltan | 346/75 X |
| 3,683,396 | 8/1972 | Keur et al. | 346/140 X |
| 3,832,579 | 8/1974 | Arndt | 346/140 X |

Primary Examiner—George H. Miller, Jr.
Attorney, Agent, or Firm—John S. Gasper

[57] ABSTRACT

Damper element which absorbs soundwave energy produced in the liquid mass of an ink jet nozzle by a magnetostrictive drop generator is submersed in the liquid mass with or without attachment to the nozzle chamber.

10 Claims, 4 Drawing Figures

NOZZLE FOR AN INK JET PRINTER

BACKGROUND OF THE INVENTION

1. Field of the Invention

This invention relates to ink jet printing and more particularly, to a nozzle for an ink jet printer.

2. Description of the Prior Art

In ink jet printers a nozzle is connected to a reservoir or other supply of liquid ink which is maintained under constant pressure. This causes ink to be discharged from an orifice in the nozzle in a continuous stream. The nozzle is vibrated in a manner which causes perturbations to be formed in the stream to cause it to break up into individual drops a relatively short distance from the nozzle. The vibrating mechanism may be either a piezoelectric or a magnetostrictive device.

It is known that the vibration of the nozzle by the transducer causes soundwaves to be propagated to the liquid mass of the ink within the nozzle. The resonances of the soundwaves in the liquid have an undesirable effect on the formation of drops. In U.S. Pat. No. 3,683,396, issued to R. I. Keur et al on Aug. 8, 1972, the nozzle structure is designed so that the fluid resonance is obtained. This requires that the design reconcile the mechanical resonance with the fluid resonance. Attention to the property of fluid resonance imposes strict limitation on the selection of the ink parameters which, if variable, affect the operation of such a device.

SUMMARY OF THE INVENTION

It is a general object of the invention to provide an improved ink jet nozzle.

It is a specific object of the invention to provide an improved ink jet nozzle in which the adverse effects of soundwave resonances in the liquid within the nozzle are eliminated.

It is a more specific object of the invention to provide an improved magnetostrictive ink jet nozzle.

Basically, this invention provides means for damping the soundwave resonances generated by the transducer element of nozzle for an ink jet printer. The damping means essentially comprises a mass of soundwave energy absorbent material placed in the ink fluid within the fluid chamber of the ink nozzle. In the preferred embodiment, the sound energy absorbing mass comprises a strip of elastomeric material such as butyl rubber or the like submerged within the fluid mass. The damper mass in one form is placed within the fluid chamber without attachment to the nozzle. In the other form of the invention the mass is attached to the wall of the fluid chamber device and acts in addition to control damping of the nozzle vibration. The damper means in its preferred form takes the shape of either a tube or a rod, which is about the length of the fluid chamber. The damper occupies about half the cross-sectional area of the fluid chamber.

With this configuration the damper material requires no special structural details, it is relatively easy to manufacture and assemble in the nozzle structure. Furthermore, the material can be selected which covers a wide range of different types of ink and performs an effective damping function for inks having a wide range of parameters. Thus, a greatly improved ink nozzle device has been provided for an ink jet printer.

The foregoing and other objects, features and advantages of the invention will be apparent from the following more particular description of preferred embodiments of the invention, as illustrated in the accompanying drawing.

DETAILED DESCRIPTION OF THE INVENTION

Figure 1:
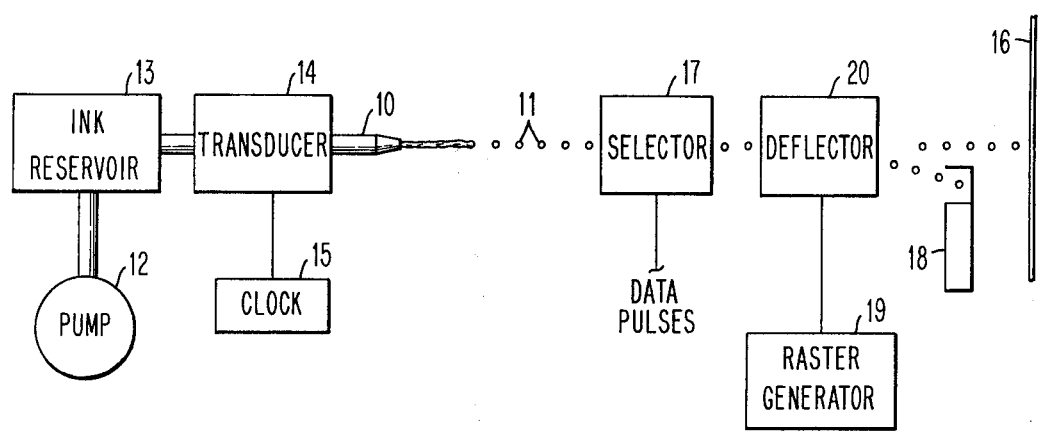
FIG. 1 is a schematic of a type of ink jet printer in which the invention is used.

As seen in FIG. 1, a magnetic ink jet printer system comprises nozzle 10 through which a stream of field controllable ink, such as a ferrofluid, is ejected under pressure from a pump 12 connected to an ink reservoir 13. Drops 11 are formed in the ink stream by a transducer 14, which vibrates nozzle 10 at a predetermined frequency established by pulses from clock 15 to produce perturbations in the ink stream whereby drops 11 are caused to be formed at a fixed point in the trajectory of the stream as the drops move toward a print medium 16. Drops not used for printing are deflected from the initial stream trajectory by a magnetic selector 17 into a gutter 18 located in advance of print medium 16. Data pulses are applied to the magnetic selector 17 in timed relation with the flight of ink drops 11. A raster scan signal is applied by raster generator 19 to a magnetic deflector 20, which causes ink drops to be dispersed in an orthogonal direction to become deposited onto paper 16 in a predetermined data pattern. The printer system thus far described is well-known in the art. Further details of construction and operation of such a system may be more fully understood by reference to U.S. Pat. No. 3,959,797, issued May 25, 1976, to D. F. Jensen.

Figure 2:
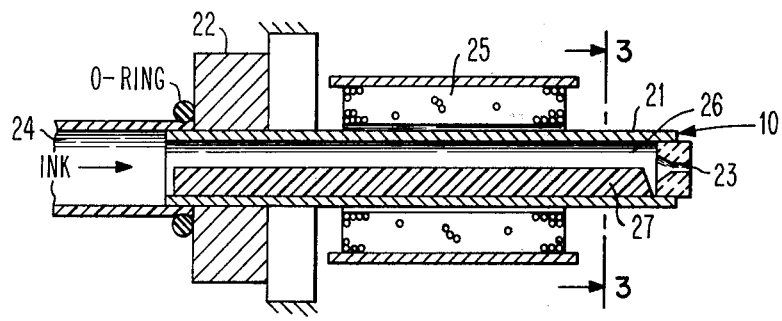
FIG. 2 is a simplified sketch of a magnetostrictive type nozzle incorporating the features of the invention.
Figure 3:
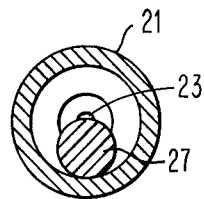
FIG. 3 is a cross-section along line 3—3 of the nozzle of FIG. 2.

In the preferred embodiment for illustrating the present invention, as seen in FIG. 2, the nozzle 10 is a tube 21 of magnetostrictive material such as nickel. One end of the tube 21 is attached to a reaction mass 22, which is maintained stationary. At the other end, tube 21 has an orifice 23 through which the ink stream is discharged when fluid ink is supplied under pressure through inlet port 24 in the one end of tube 21. The transducer for magnetostrictively exciting tube 21 comprises an exciter coil 25 electrically connected to be energized by an alternating signal generated at a desired frequency under control of clock 15, as seen in FIG. 1. The magnetostictive excitation of tube 21 by the longitudinal field of coil 25 sets up standing waves in the fluid mass 26 within the fluid chamber of tube 21 and causes perturbations on the ink mass passing through the tube and out orifice 23 that controls the drop breakup process.

Figure 4:
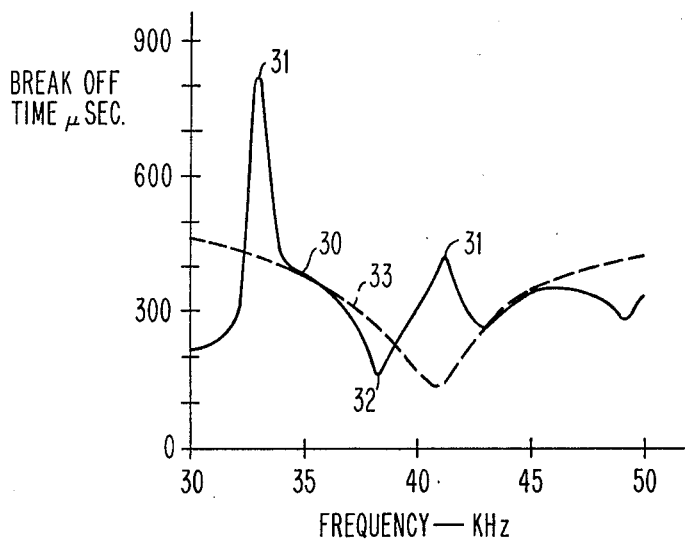
FIG. 4 is a performance graph illustrating the principle of operation of the nozzle utilizing the features of the invention.

In the preferred form of practicing this invention, tube 21 at its primary resonance has a length which is approximately ¼ wavelength. Tests of a nickel tube 21 without ink within the fluid chamber shows that the resonance curve of the structure is without any secondary resonance maxima or minima in the vicinity of the primary resonance. With ink in the tube, however, standing waves are set up in the liquid column which complicate the resonance curve greatly. The liquid column resonances are not stable, since they depend on the ink properties and the entrance condition of the ink into the tube, as well as the tube dimensions. As seen in FIG. 4, curve 30 shows the characteristic curve for a ferrofluid ink showing maxima and minima peaks 31 and 32.

The maxima and minima peaks in accordance with this invention, as previously described, depend upon the use of a damper means which filters out the liquid column resonances. As seen in FIG. 2, the damper comprises an elongate tube or rod 27 located inside the fluid chamber of tube 21. The rod 27 is totally immersed in the fluid mass 26. The rod in its preferred form occupies about half the cross-sectional area of the inside of tube 21. The size of the damper rod is not critical. Various lengths could be used which would be effective depending upon the quality of the ink and amount of energy imparted to the ink during vibration. Various materials may be used for the damping material for absorbing the soundwave energy propagated by the magnetostrictive vibration of the tube to the fluid mass 26. A preferred material comprises a resilient elastomeric material such as butyl rubber. One such material used has the following paramaters:

| | | |
|---|---|---|
| Diameter of damper | .063 | inches |
| Length of damper | 1.0 | inch |
| Durometer | 50 | |
| Length of nickel tube | 1.0 | inch |
| Inside dia. of nickel tube | .095 | inches |
| External dia. of nickel tube | .125 | inches |
| Orifice diameter | .0025 | inches |

A ferrofluid ink was used having the following properties:

| | |
|---|---|
| Density | 1.3 gms/cc |
| Viscosity | 8.5 c poise |
| Magnetic moment | 24 abamps/cm$^2$/gm |

A process for making such ink is described in U.S. Pat. No. 3,990,981, issued to B. A. Gardineer et al on Nov. 9, 1976.

While the physics of how the damper eliminates the liquid column resonances is not fully understood, it is believed that an elastomeric material responds to pressure fluctuations within the fluid mass 26 in a manner analagous to a capacitor so that the length of the damper 27 acts analagously to a continuous filter network.

The damper 27 can be merely placed within the liquid mass 26 without attachment to the tube 21. Curve 33 in FIG. 4 shows the results, in that secondary resonance peaks have been eliminated. An alternative arrangement, however, would be to bond the damper elastomeric material to the inside of the tube 21. This configuration would have the additional advantage that a measure of controlled damping is added to the vibration of tube 21 by electromagnet 25.

While the use of a fluid damper is illustrated in connection with a magnetostrictive transducer, a similar damper could be used in an ink jet nozzle where soundwaves are propagated in a liquid ink mass within a nozzle chamber by other vibrating means such as piezoelectric crystal, voice coil, etc.

It should be noted that the nozzle structure of the invention has application where dielectric or other type inks might be used, e.g. in electrostatic ink jet printers or the like, as well as with the ferrofluids illustrated.

While the invention has been particularly shown and described with reference to preferred embodiments thereof, it will be understood by those skilled in the art that the foregoing and other changes in form and details may be made therein without departing from the spirit and scope of the invention.

We claim:

1. In an ink jet printer system wherein ink under pressure flows through a nozzle device and an electromechanical transducer is operated at a predetermined frequency for vibrating said nozzle device for applying perturbations to said ink as it flows through said nozzle and is emitted as a continuous stream to break into discrete drops as a result of said perturbations, said vibration of said nozzle device by said transducer operation resulting in the production of soundwaves within the body of said ink in said nozzle, the improvement comprising damper means within said nozzle device in contact with said body of ink contained within said nozzle device for absorbing energy from said soundwaves.

2. In an ink jet printer system in accordance with claim 1 in which said damper means is a resilient member submerged in said ink body within said nozzle.

3. In an ink jet printer system in accordance with claim 2 in which said nozzle comprises a vibratory element having a chamber and said body of ink is within said chamber, and said damper means is submerged within said body of ink within said chamber and is attached to the interior wall of said chamber.

4. In an ink jet printer system in accordance with claim 2 in which said damper means is an elastomeric material.

5. In an ink jet printer system in accordance with claim 4 in which said damper means is butyl rubber.

6. In an ink jet printer system in accordance with claim 2 in which said nozzle comprises a vibratory element having a chamber and said body of ink is within said chamber, and said damper means is submerged in said ink body within said chamber without attachment to said vibratory element.

7. In an ink jet printer system in accordance with claim 6 in which said damper is an elongate member extending substantially the full length of said chamber in the direction of propagation of said soundwaves.

8. In an ink jet printer system in accordance with claim 7 in which said damper has a cross-section area approximately equal to one-half the cross-sectional area of the body of said ink in said chamber.

9. In an ink jet printer system in accordance with claim 6 in which said vibratory element is magnetostrictive.

10. In an ink jet printer system in accordance with claim 9 in which said vibratory element is nickel.

* * * * *